United States Patent
Yang et al.

(10) Patent No.: US 6,744,611 B2
(45) Date of Patent: Jun. 1, 2004

(54) OVER-VOLTAGE CROWBAR FOR LIGHTNING SURGE AND ESD PROTECTION

(75) Inventors: Ta-yung Yang, Taipei (TW); Jenn-yu G. Lin, Taipei (TW)

(73) Assignee: System General Corporation, Milpitas, CA (US)

( * ) Notice: Subject to any disclaimer, the term of this patent is extended or adjusted under 35 U.S.C. 154(b) by 32 days.

(21) Appl. No.: 10/065,533

(22) Filed: Oct. 28, 2002

(65) Prior Publication Data

US 2004/0080880 A1 Apr. 29, 2004

(51) Int. Cl.[7] .................................................. H02H 9/00
(52) U.S. Cl. ....................................................... 361/56
(58) Field of Search ........................... 361/56, 111, 119, 361/93.1; 327/304, 321, 327, 328

(56) References Cited

U.S. PATENT DOCUMENTS 5,598,313 A * 1/1997 Gersbach ...................... 361/56

* cited by examiner

*Primary Examiner*—Ronald Leja
(74) *Attorney, Agent, or Firm*—Jianq Chyun IP Office

(57) ABSTRACT

FI over-voltage crowbar provides lightning surge and ESD protection. The crowbar has a clamping transistor, which is driven by a mirror-amplifier. When an input surge voltage is higher than the voltage of a Zener diode, the mirror-amplifier will be switched on and generate an amplified voltage. The amplified voltage works together with a speed-up capacitor easily to switch on the clamping transistor. The mirror-amplifier has an n-transistor and two p-transistors, which provide sufficient headroom for the turn-on of a clamping transistor. The over-voltage crowbar of this invention rapidly drives the clamping transistor to low impedance, thereby achieving a higher sustenance rating for lightning surge and ESD in the integrated circuit.

5 Claims, 5 Drawing Sheets

OVER-VOLTAGE CROWBAR FOR LIGHTNING SURGE AND ESD PROTECTION

BACKGROUND OF INVENTION

1. Field of Invention

The present invention relates to protection circuits. More particularly, the present invention relates to the protection circuit of an integrated circuit.

2. Background of the Invention

An over-voltage protection circuit is typically used in an integrated circuit to protect the integrated circuit from lightning surge and ESD (electric static discharge). Referring to FIG. 1, an over-voltage crowbar connects with a protected circuit in parallel. When the surge voltage is introduced into the circuit, the over-voltage crowbar clamps the voltage under the absolute maximum value to avoid the circuits from over-voltage breakdown. FIG. 2 shows a traditional crowbar circuit. If the surge voltage in the Vcc is higher than the zener voltage (Vz) of a zener diode 31, a clamping transistor 35 is driven to clamp the voltage in Vcc. Since the energy of the surge voltage in the Vcc is reduced instantly by the clamping transistor 35, a fast response is needed. Furthermore, a low Rds-on (turn-on impedance from drain to source) of the clamping transistor 35 is required. The Rds-on can be calculated as follows:

$$Ids = K \times [(Vgs\ Vt) \times Vd(V^2 ds/2)] K = \sigma \times (W/L) Rds\text{-on} = Vds/Ids = L/\{W \times \sigma \times [(Vgs-Vt)-(Vds/2)]\} \quad (1)$$

In the above equations, Vds is a drain-to-source voltage, Vgs is a gate-to-source voltage, Vt is a threshold voltage, σ is the product of mobility and oxide capacitance/unit, W is the width of a transistor, and L is the length of the transistor.

According to Equation (1), we find that the Rds-on is proportional to the Vds and inversely proportional to the Vgs. In order to gain a low Rds-on, the clamping transistor 35 needs a higher Vgs when Vds is high. Unfortunately, the surge voltage in the Vcc creates a high Vds for the clamping transistor 35 and a higher Rds-on. In addition, an existing negative feedback phenomenon restricts the response time and impedance of the Rds-on. Referring to the Equation 1), Vgs is correlated to the Vds, where Vgs=Vds−Vz. Therefore, even when a bigger size of the clamping transistor 35 and the Zener diode 31 are used in FIG. 2, it is still hard to obtain a fast response and the low impedance performance.

SUMMARY OF INVENTION

This invention provides an over-voltage crowbar for lightning surge and ESD protection. The over-voltage crowbar comprises a Zener diode, a mirror amplifier (mirror-amp), two resistors, a speed-up capacitor and a clamping transistor.

Once the surge voltage in Vcc is higher than the Zener voltage, the mirror-amp is driven to generate an amplified voltage. The amplified voltage works together with the speed-up capacitor that easily turns on the clamping transistor. Two resistors are used for grounding the input of the mirror-amp and the input of the clamping transistor respectively to ensure that the mirror-amp and the clamping transistor are off in the normal condition. The mirror-amp includes an n-transistor and two p-transistors, which provide sufficient headroom to drive the clamping transistor on.

Advantageously, the over-voltage crowbar of this invention rapidly drives the clamping transistor to low impedance; thereby achieving improved sustenance rating for lightning surge and ESD in the integrated circuit.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
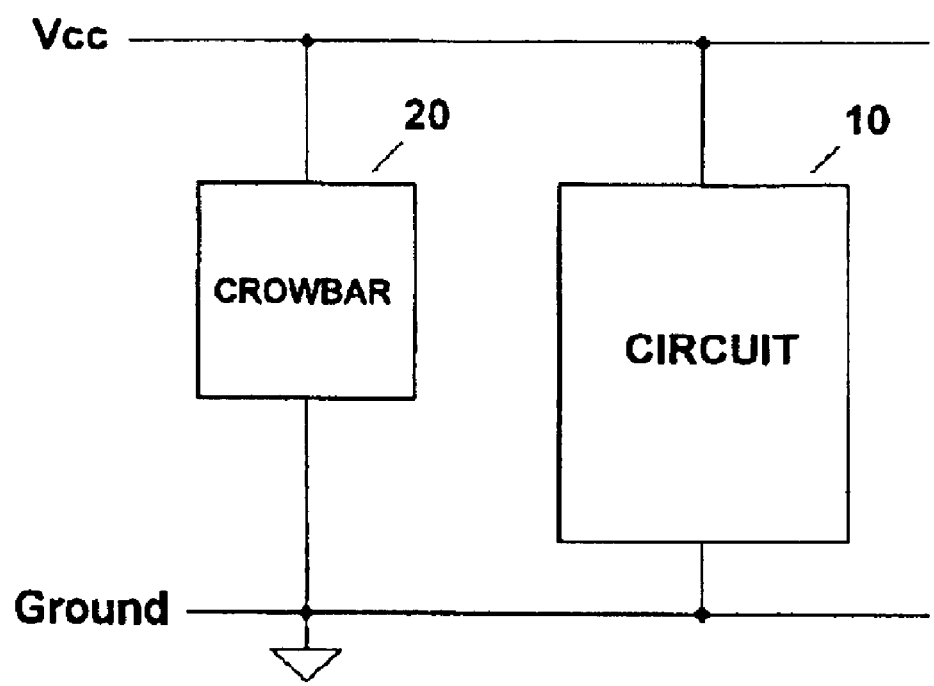
FIG. 1 shows the connection of the over-voltage crowbar and a protected circuit thereof.
Figure 2:
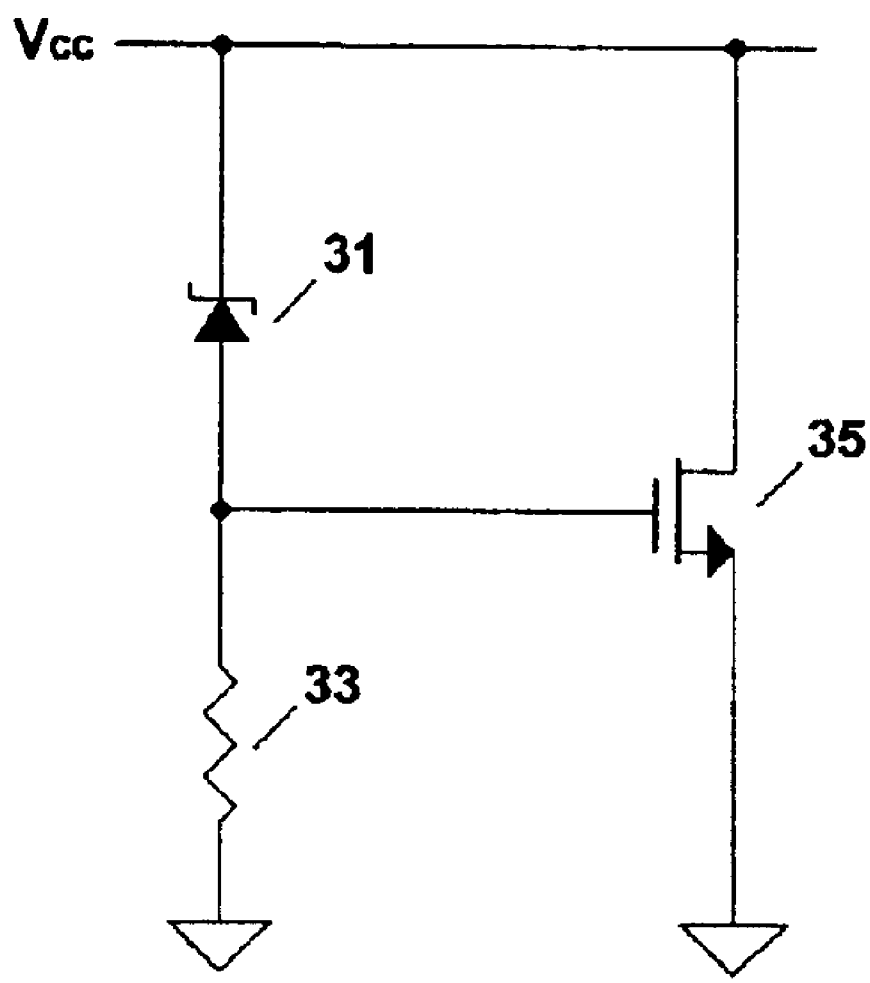
FIG. 2 shows a traditional crowbar circuit.
Figure 3:
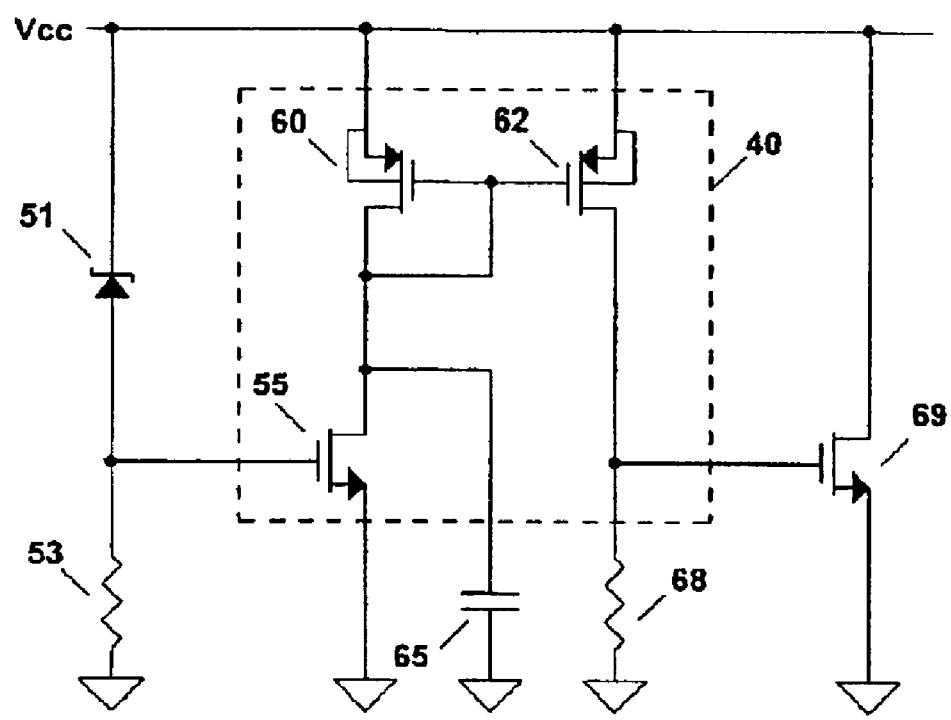
FIG. 3 schematically shows an over-voltage crowbar for lightning surge and ESD protection according to one embodiment of the present invention.

FIG. 3 schematically shows an over-voltage crowbar for lightning surge and ESD protection according to one embodiment of the present invention. The over-voltage crowbar comprises a Zener diode 51, a mirror-amp 40, a clamping transistor 69, a speed-up capacitor 65, a first resistor 53 and a second resistor 68. The mirror-amp 40 includes an n-transistor 55, a first p-transistor 60 and a second p-transistor 62.

Figure 4:
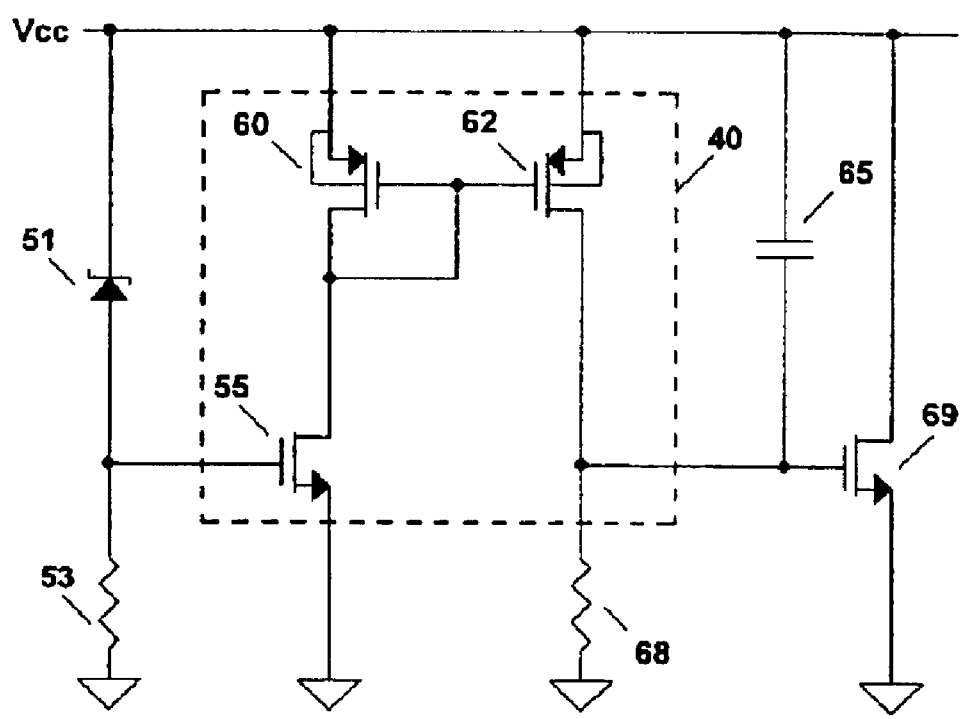
FIG. 4 shows an over-voltage crowbar for lightning surge and ESD protection according to another embodiment of the present invention.
Figure 5:
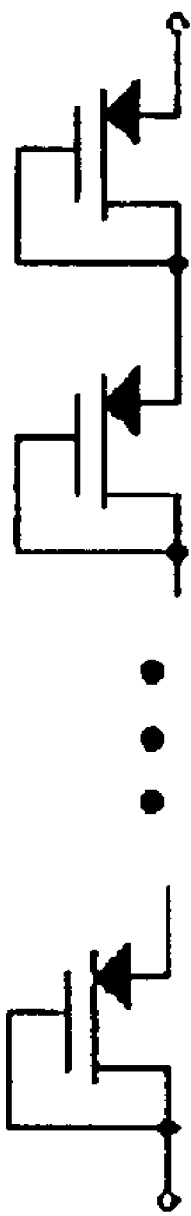
FIG. 5 shows an alternative of the Zener diode according to a preferred embodiment of the present invention.

The Zener diode 51 is connected between an input Vcc and the input of the mirror-amp 40. The input of the mirror-amp 40 is connected to a first resistor 53 connected to ground to ensure that the mirror-amp is switched off during the normal operation condition. The output of the mirror-amp 40 is coupled to the gate of the clamping transistor 69. A second resistor 68 connected to the gate of the clamping transistor 69 is grounded to make sure the clamping transistor 69 is in an off state under the normal operation condition. When the input surge voltage in Vcc is higher than the Zener voltage (Vz) of the Zener diode 51, the voltage of (Vcc−Vz) drives the mirror-amp 40 on. In the mean time, the output of the mirror-amp 40 switches on the clamping transistor 69, while the output voltage of the mirror-amp 40 is close to the voltage in Vcc. Thus, this high voltage output of the mirror-amp 40 will drive the drain-to-source impedance of the clamping transistor 69 to the lowest impedance. The gate of the n-transistor 55 is connected to the input of the mirror-amp 40. The drain of the n-transistor 55 and the first p-transistor 60, and the gate of the first p-transistor 60 and the second p-transistor 62 are coupled together to establish the amplifier. The source of the n-transistor 55 is grounded. The source of the first p-transistor 60 and the second p-transistor 62 are connected to the Vcc. The drain of the second p-transistor 62 is connected to the output of the mirror-amp 40, which is also coupled to the gate of clamping transistor 69. Because the switch-on status of the second p-transistor 62 is pulled down by the n-transistor 55, enough headroom is given for the second p-transistor 62 to output the voltage close to the voltage in Vcc. The speed-up capacitor 65 connected between the gate of second p-transistor 62 and the ground accelerates the turn-on speed of the clamping transistor 69 when a surge voltage is introduced into the Vcc. FIG. 4 shows another embodiment of the present invention, in which the speed-up capacitor 65 is connected between the source and the drain of the second p-transistor 62. Referring to FIG. 5 for an alternative of the Zener diode 51, a number of transistors are connected in series to provide an upper limit voltage for the over-voltage threshold. Although the upper limit voltage is not accurately compared to the Zener voltage, the accuracy is sufficient for many applications.

As described above, the over-voltage crowbar of the present invention improves the lightning surge and ESD sustenance rating for the integrated circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An over-voltage crowbar for lightning surge and ESD protection comprising:
    a Zener diode, providing an over-voltage threshold under an over-voltage condition;
    a clamping transistor, having a drain coupled to an input voltage so as to clamp the input voltage when the input voltage is higher than said over-voltage threshold;
    a mirror amplifier, responsive to the input voltage for generating an amplified voltage to drive the clamping transistor in response to the over-voltage condition, wherein the input voltage is coupled to an input of the mirror amplifier through said Zener diode, and an output of the mirror amplifier is connected to a gate of said clamping transistor;
    two resistors, connected from the ground to said input of said mirror amplifier and said gate of said clamping transistor respectively for turning off said mirror amplifier and said clamping transistor in a normal operation condition; and
    a speed-up capacitor, accelerating a response time of said mirror amplifier.

2. The over-voltage crowbar in accordance with claim 1, wherein said mirror amplifier comprises:
    an n-transistor, having a gate coupled to said input of said mirror amplifier and a source connected to the ground;
    a first p-transistor, having a drain, a gate and a source; and
    a second p-transistor, having a drain coupled to said output of said mirror amplifier, a gate coupled to said drain and said gate of said first transistor, and a source coupled to said source of said first p-transistor and to the input voltage to form an amplifier for providing the amplified voltage to drive said clamping transistor in response to the over-voltage condition.

3. The over-voltage crowbar in accordance with claim 2, wherein said speed-up capacitor is connected from said gate of said second p-transistor to the ground.

4. The over-voltage crowbar in accordance with claim 2, wherein said speed-up capacitor is connected between said source and said drain of said second p-transistor.

5. An over-voltage crowbar for lightning surge and ESD protection comprising:
    a plurality of transistors, connected in series to provide an over-voltage threshold under an over-voltage condition;
    a clamping transistor having a drain coupled to an input voltage so as to clamp said input voltage when said input voltage is higher than said over-voltage threshold;
    a mirror amplifier responsive to said input voltage for generating an amplified voltage to drive said clamping transistor in response to said over-voltage condition, wherein said input voltage is coupled to an input of said mirror amplifier through said transistors, and an output of said mirror amplifier is connected to a gate or said clamping transistor;
    two resistors connected from the ground to said input of said mirror amplifier and said gate of said clamping transistor respectively for turning off said mirror amplifier and said clamping transistor under a normal operation condition; and
    a speed-up capacitor accelerating a response time of said mirror amplifier.

* * * * *